United States Patent
Sabounjian

(10) Patent No.: US 9,232,859 B2
(45) Date of Patent: *Jan. 12, 2016

(54) SHELVING CONNECTOR

(71) Applicant: Pro-Mart Industries, Inc., Irvine, CA (US)

(72) Inventor: Azad Sabounjian, Irvine, CA (US)

(73) Assignee: Pro-Mart Industries, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,252

(22) Filed: Nov. 17, 2014

(65) Prior Publication Data
US 2015/0201753 A1   Jul. 23, 2015

Related U.S. Application Data

(63) Continuation of application No. 13/839,565, filed on Mar. 15, 2013, now Pat. No. 8,887,647.

(51) Int. Cl.
| | |
|---|---|
| *A47B 96/06* | (2006.01) |
| *A47B 57/10* | (2006.01) |
| *A47B 57/26* | (2006.01) |
| *A47B 96/02* | (2006.01) |
| *A47B 47/00* | (2006.01) |
| *A47B 31/00* | (2006.01) |

(52) U.S. Cl.
CPC ............... *A47B 96/06* (2013.01); *A47B 57/10* (2013.01); *A47B 57/265* (2013.01); *A47B 96/024* (2013.01); *A47B 47/0083* (2013.01); *A47B 2031/004* (2013.01); *Y10T 403/44* (2015.01); *Y10T 403/7096* (2015.01)

(58) Field of Classification Search
CPC ...... A47B 13/021; A47B 57/16; A47B 57/26; A47B 57/265; A47B 9/00; A47B 5/13; A47B 5/103
USPC .......... 108/106–108, 144.11, 147.11–147.15; 211/186–188, 190
See application file for complete search history.

(56) References Cited

U.S. PATENT DOCUMENTS

| | | |
|---|---|---|
| 3,523,508 A | 8/1970 | Maslow |
| 4,318,352 A | 3/1982 | Friedman et al. |
| 4,627,543 A | 12/1986 | Nicely |
| 5,676,263 A | 10/1997 | Chang |
| 6,015,052 A | 1/2000 | Goldberg et al. |
| 6,068,143 A | 5/2000 | Wang |
| 6,113,042 A | 9/2000 | Welsch et al. |
| 6,260,488 B1 | 7/2001 | Yang et al. |
| 6,474,327 B1 | 11/2002 | Bossler |
| 6,695,156 B1 | 2/2004 | Wang |
| 6,748,878 B2 | 6/2004 | Chen |
| 7,401,754 B2 | 7/2008 | Welch et al. |
| 8,887,647 B2 | 11/2014 | Sabounjian |

*Primary Examiner* — Matthew Ing
(74) *Attorney, Agent, or Firm* — Stetina Brunda Garred & Brucker; Lowell Anderson

(57) ABSTRACT

A compression lock on a connector for a shelving post has upper and lower, mating collar parts having distal ends encircling more than 180 degrees of the post but separated by a gap through which the post can pass. Each distal end has an axially extending projection with a rounded end and a recess adjoining the projection. The projections of one collar part mate with the recesses of the other collar part to interlock the collar parts around a compression sleeve and form a frusto-conical inner surface that wedges the a mating sleeve against the post to affix a shelf attached to the connector.

23 Claims, 8 Drawing Sheets

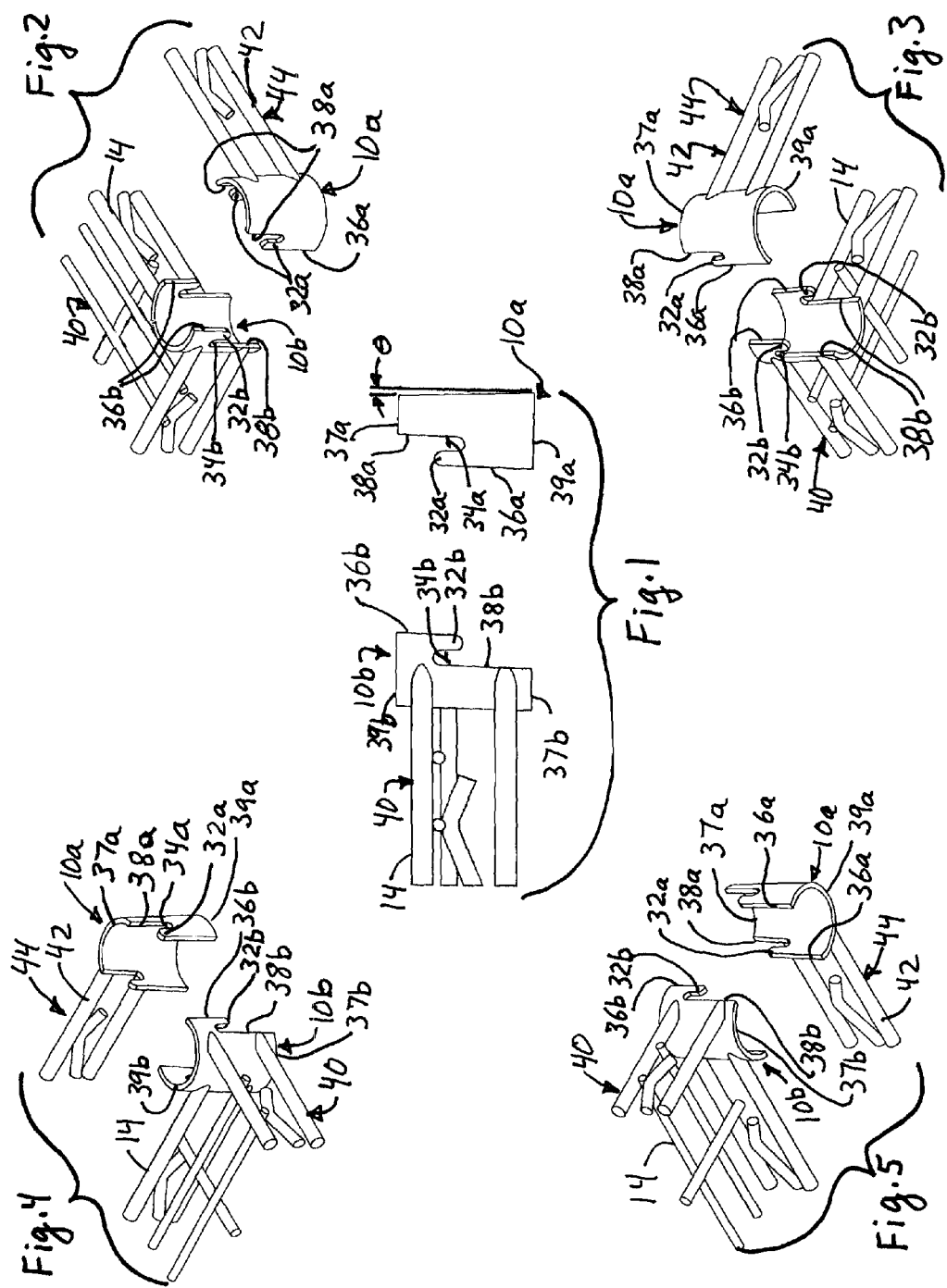

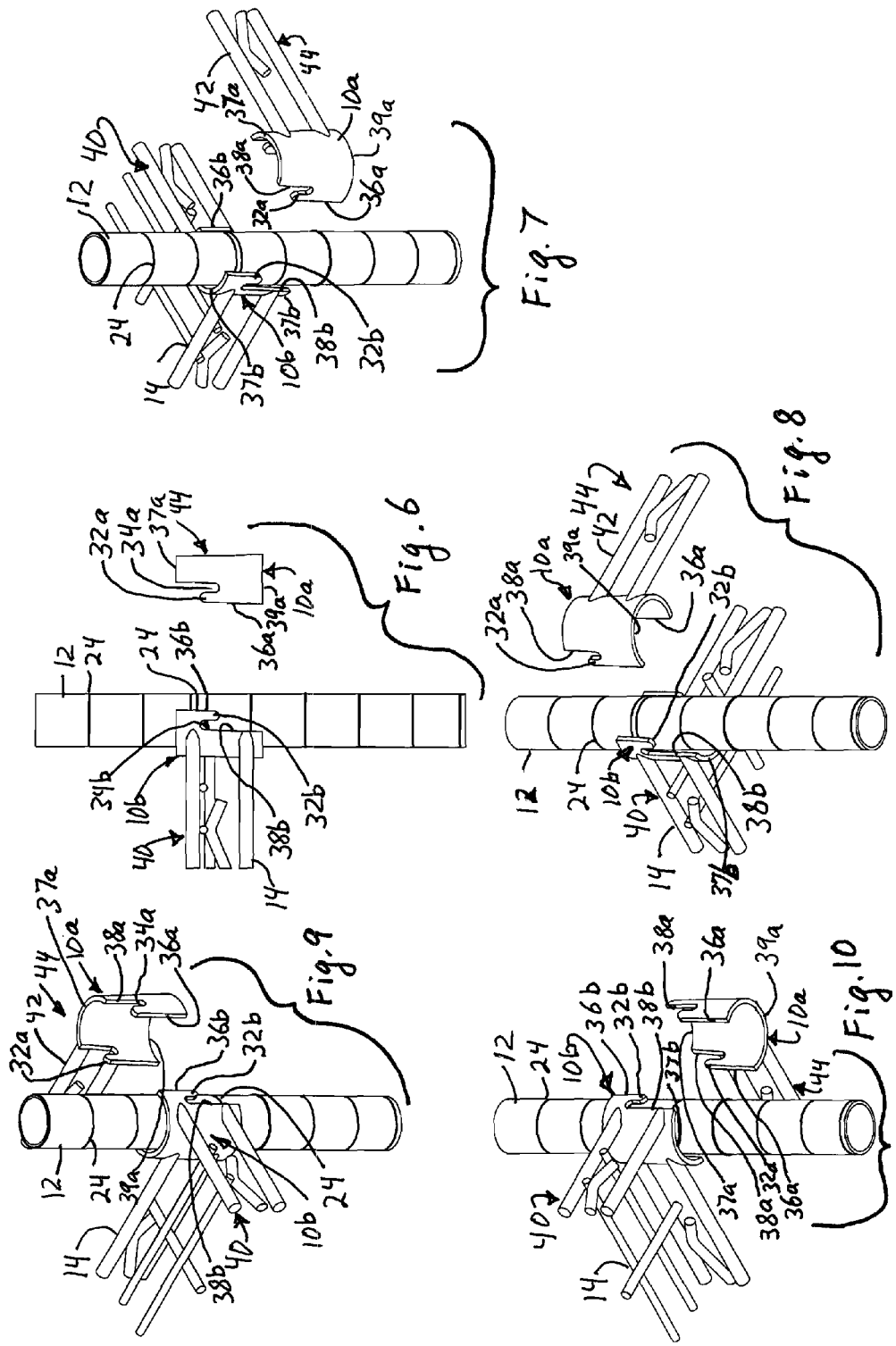

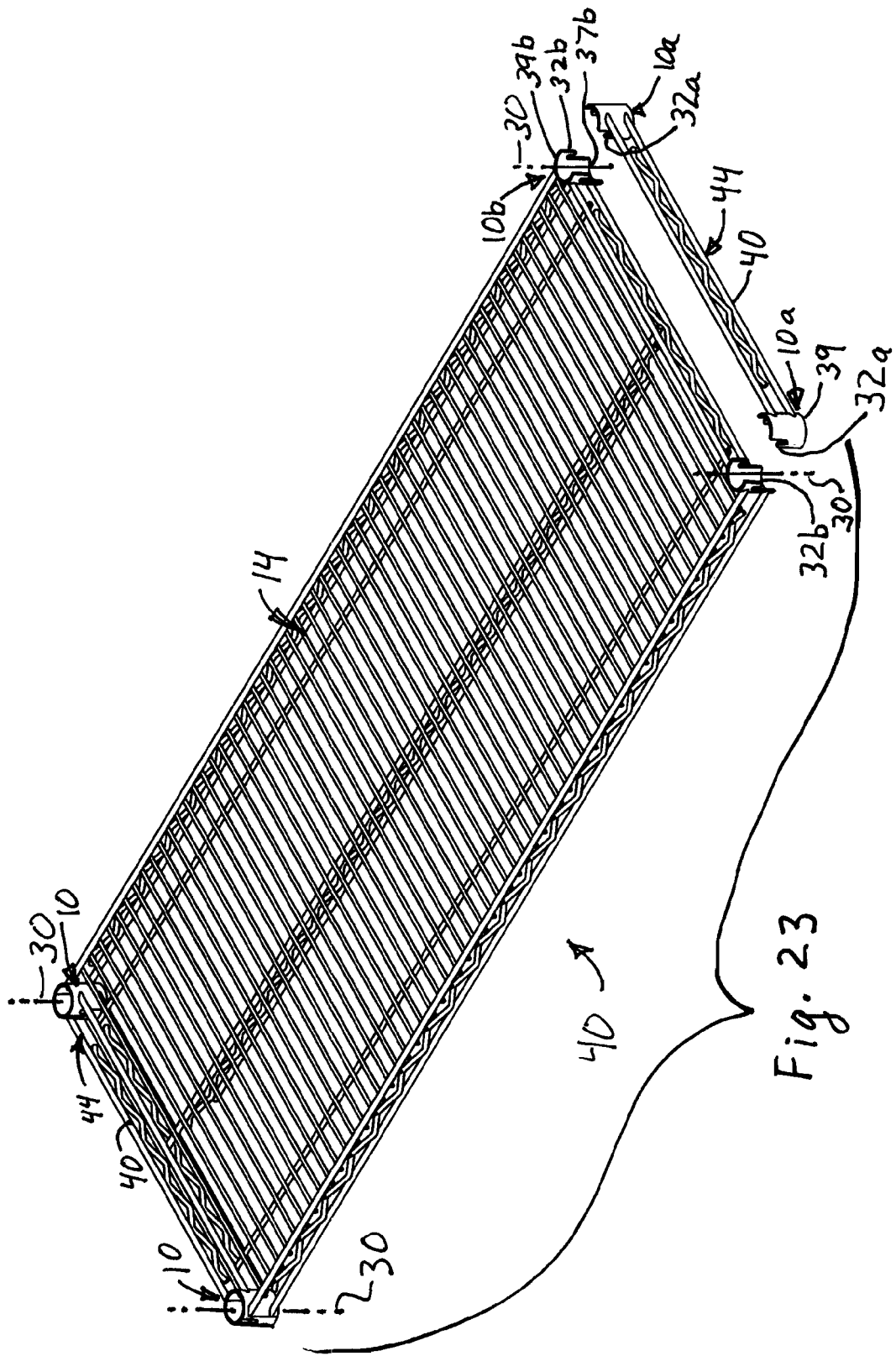

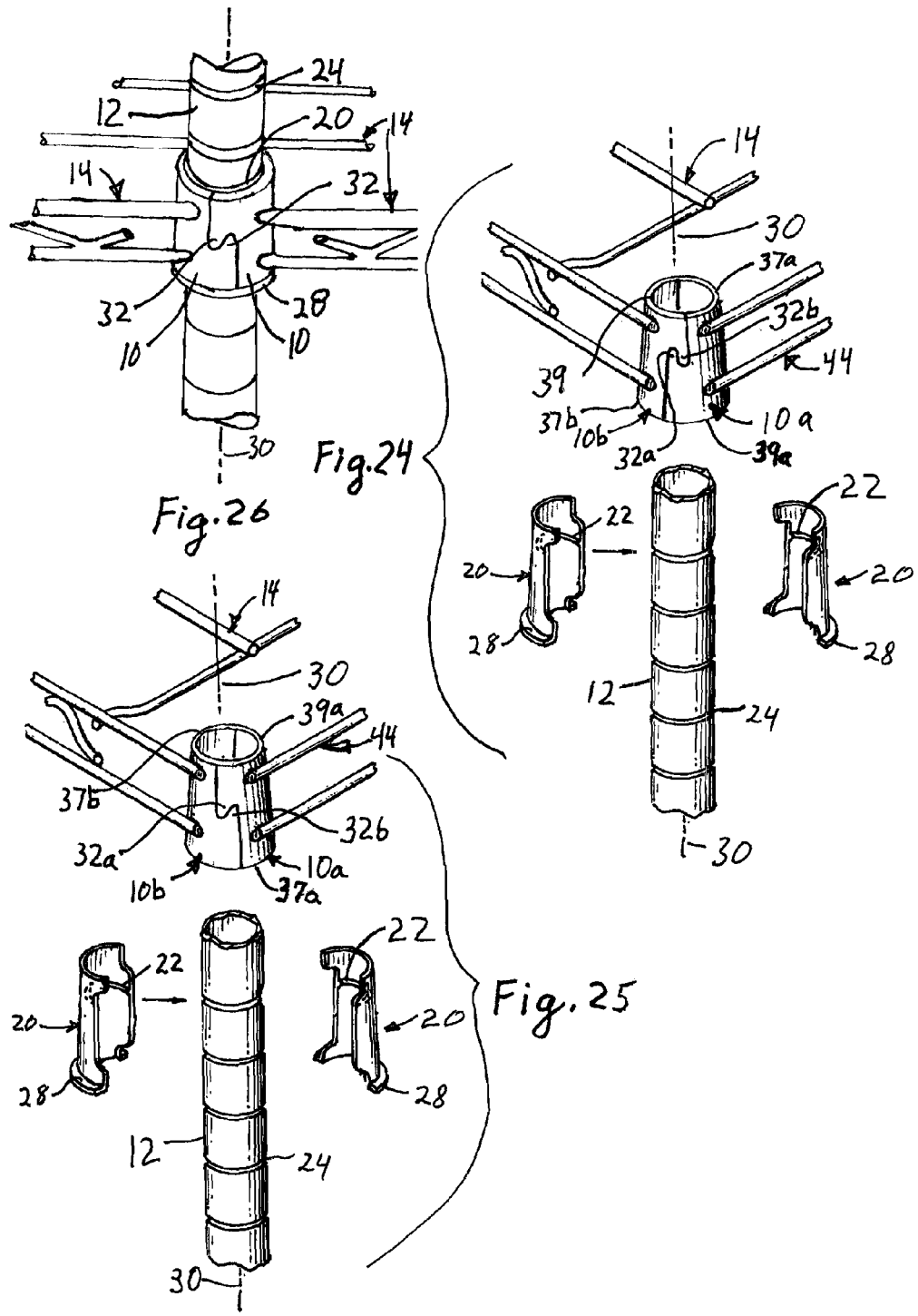

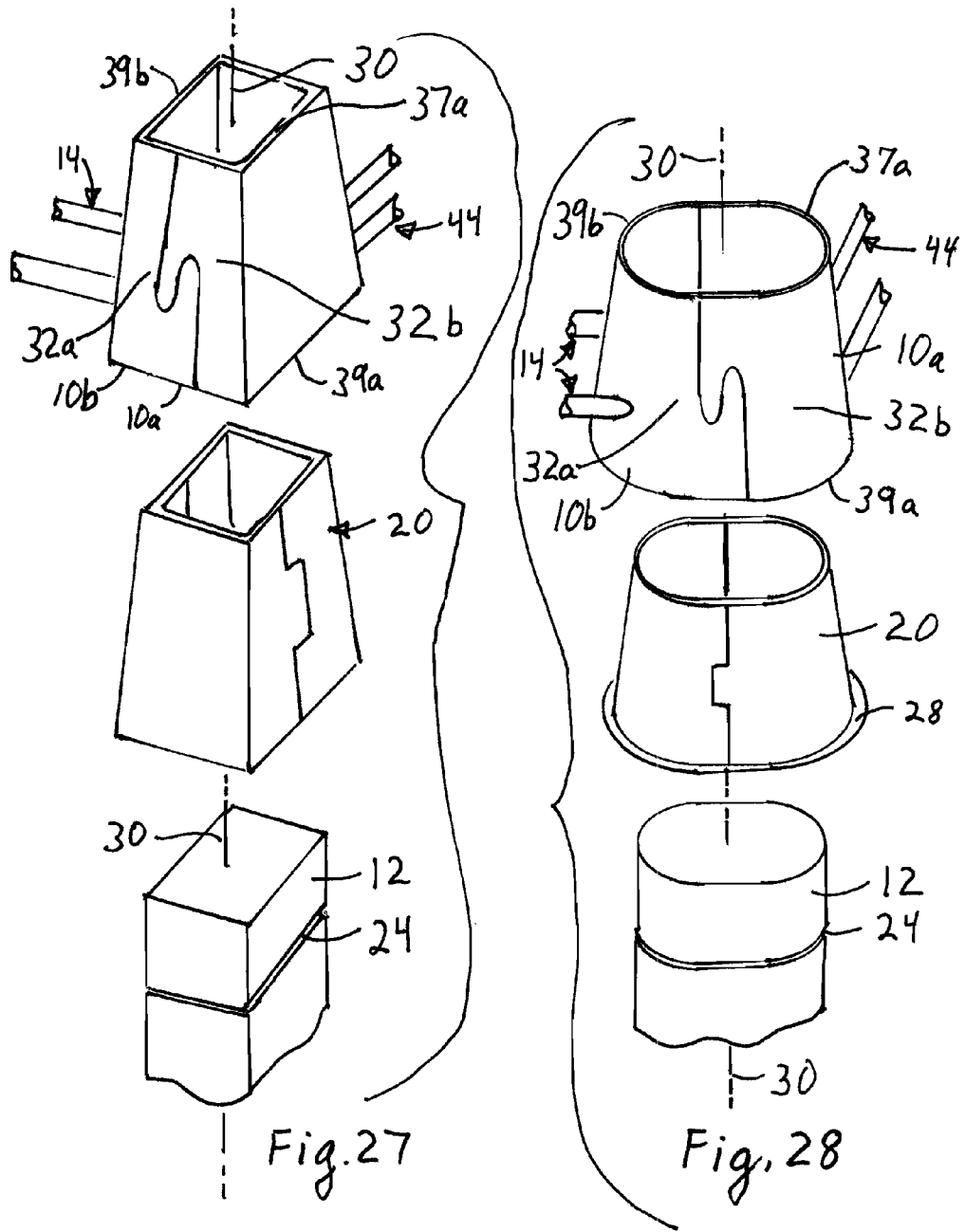

SHELVING CONNECTOR

BACKGROUND

The present invention relates generally to a support structure that can be used to support shelving or other elements for carrying or supporting any desired item. More particularly, the present invention relates to a support assembly for use in, for example, a knock-down shelving system to adjustably support shelves.

Current knock-down shelving systems include a plurality of support posts for supporting one or more shelves at corner support assemblies thereof. These shelving systems have a sleeve or wedge member and an encircling collar both adapted to be secured to a generally cylindrical support post having a circular cross-section. The sleeve has an inner surface that is configured to embrace the support post and has an outer surface that is wedge shaped usually taking the form of a frusto-conical shape with a narrower diameter at the top and a larger diameter at the bottom. The collar has an outer surface that is secured to a shelf. The collar has an internal wedge surface formed to mate with the frusto-conical wedge surface of the sleeve but either inclined in the opposing direction or having a smaller upper opening which does not allow passage of the sleeve on the post. Thus, when the sleeve embraces the post and the collar embraces the sleeve, axial loading of the collar in one direction causes the collar's inward facing wedge surface to mate with the outward facing wedge surface on the sleeve, thereby urging the sleeve toward the post. Since the collar is restrained from radial expansion and has a fixed diameter, and since relative movement of the inclined surfaces of the sleeve and the collar want to increase in diameter as they move relative to one another in axially opposing directions, the non-expandable outer collar forces the sleeve inward and clamps the sleeve against the post and wedges the collar and sleeve into place on the post.

Such shelving systems are disclosed in U.S. Pat. Nos. 3,424,111 and 3,523,508, which use a plurality of cylindrical support posts each formed with a series of equally spaced, annular grooves on its outer surface. A basic shelving system includes four such posts to support one or more formed-wire shelves, with each shelf having a frusto-conically-shaped collar at each corner for receiving a support post. A two-piece interlocking sleeve fits around the support post. The sleeve has a circumferential rib on its interior surface for engaging one of the grooves on the support post and has a frusto-conically-shaped outer surface, which is widest at the bottom, designed to complement the shape of the shelf collars. The support posts fitted with sleeves are received in the collars of each shelf to assemble the shelving system. When assembled, the weight of the shelf and any items placed on the shelf pushes downward on the collar and sleeve, creating a radially-inwardly directed wedging force between the collars and sleeves, which brings the sleeves into tight contact with the posts.

Similar wedging concepts are used in U.S. Pat. Nos. 4,811,670; 4,946,350; 5,271,337; 5,279,231 and 6,113,042. Some of these devices use over-center cams to ensure the collars are locked in place.

Further, the above described collars have a fixed diameter and thus pass along the length of the post until they reach the sleeve with which they wedge against the post. That requires assembling the shelving from the bottom up or the top down since the collars cannot be positioned between two previously installed shelves. Further, a shelf cannot be inserted between pre-installed shelves since the collars cannot slide over previously installed sleeves or collars. Because the collars in these prior art connectors were tubular they had to be slid axially over one end of the post in order to mate with the sleeve and wedge the parts in place. To address this difficulty collars which encircles less than a full 360 degrees were developed, with some collars having open vertical slots like U.S. Pat. Nos. 6,302,284 and 6,257,426, and other collars mating with sleeves or other parts along generally vertical axes, as described in U.S. Pat. Nos. 6,068,143 and 4,656,952. But the open slotted collars provide a weak connection because sufficient weight on the shelf and collar will spread the unconnected parts of the collar apart, releasing he support. The collars mating with shaped sleeves required more expensive and stronger sleeves. The collars using vertical joints require precise alignment of the vertical joints making them difficult to align and assemble.

Despite the long use of these above-described shelving systems, a need exists for an improved connector and shelving system, especially one easier to assemble and more flexible in its assembly. There is thus a need for an improved shelving connector that may be installed without having to slide the connector along the entire length of the post to the desired shelving position and that may be easily installed.

BRIEF SUMMARY

A compression lock on a connector for a shelving post having a longitudinal axis. The connector has upper and lower, mating collar parts each having distal ends encircling more than 180 degrees of the post but separated by a gap through which the post can pass laterally. Each distal end has an axially extending projection with a rounded end and a recess adjoining the projection inward of the projection and distal end. The projections of one collar part mate with the recesses of the other collar part to interlock the collar parts around a compression sleeve and form a frusto-conical inner surface that wedges a mating surface of the sleeve against the post to position a shelf attached to the connector on the post.

A shelving connector is provided having an inward facing surface forming a wedge shape that cooperates with existing sleeves having outward facing, wedge shaped surfaces, where the wedge shaped surfaces are either inclined in opposing directions to force the sleeve against a post extending through the sleeve, or the surfaces are inclined in the same direction so the parts nest together but the connector has a smaller upper opening through which the larger bottom end of the sleeve cannot pass so as to clamp the sleeve toward the post. Some or all of the sleeve is preferably split or slit along a longitudinal axis and deforms inward more easily than would a continuous sleeve. The collar has a fixed diameter configured to mate with the sleeve to form the wedging surfaces. But the collar is formed of first and second interlocking parts. Both of the collar parts may encircle a circumference of more than 180 degrees but much less than 360 degrees so each collar forms two distal ends that are separated by a gap. The gap is large enough to allow the post to fit through the gap, even if the collar parts are resiliently bent apart to fit the post through the gap, and even when the collar is fit laterally onto the post. Each collar part has vertically aligned projections at distal ends of the collar with adjacent vertically aligned recesses inward of the projections. The projections of one collar fit into the recesses of the other collar. The first collar part thus has vertically extending projections and recesses with the second collar part having mating recesses and projections. Each collar part has a projection at its distal end adjacent a recess, with the projection of each collar fitting into the recess of the other collar. The mating of the collar parts of the recess and projection along the generally vertical direction vertical offset restrains the collar parts from moving apart laterally and provides a fixed collar diameter to wedge the inner sleeve against the post and clamp the collar in position on the post.

A shelf may be attached to one part of the two-part collar, and the other collar parts added to complete the collar and lock the radial diameter of the collar relative to the post. Preferably, two of the locking collar parts are connected according to the shelf length. Thus, the shelf and attached first collar part may be moved laterally from a first direction to encircle a post at a location above a sleeve and then moved downward into engagement with the sleeve, with the mating second collar part moved laterally from an opposing direction to encircle the same post at a location above the sleeve and then moved downward into interlocking engagement with first collar part and with the sleeve. Likewise, the collar parts could both be interlocked above the sleeve and jointly moved downward into wedging position with the collar.

Moreover, as long as the vertical projections and recesses on the two collar parts extend in opposing, mating directions they may be directed either upward or downward on a specific collar part as long as the mating collar part has them oriented in the mating, opposing arrangement. Thus, the shelf and attached first collar part may have distal projections pointing downward rather than upward, with the locking collar parts having distal projections pointing upward to mate with those of the first collar parts.

It is believed useful, but not required, to have an outward extending lip on a bottom of the sleeve to help hold the collar parts in position on the sleeve In more detail, there is advantageously provided a connector assembly for use with posts having a cylindrical cross-section of diameter D, used with a wedging sleeve to position shelves along a longitudinal axis of the post. The sleeve may have a frusto-conical outer surface with a first, small sleeve end and a second, larger sleeve end. Both sleeve ends encircle the longitudinal axis during use. The connector includes a collar having first and second mating parts which when mated form a frusto-conical surface sized to encircle and wedge against the sleeve during use. Each collar part has two distal ends with projections having an inner surface extending along the frusto-conical surface of the collar. The distal ends encircle more than 180 degrees of the post during use and are separated by a gap sufficiently large to allow the post to pass laterally through the gap during use. Each projection forms a side of a recess adjoining each projection. The recess is configured to receive a projection on the other collar part when they are mated to form the frusto-conical surface.

In further variations, each projection has a rounded end and each recess has a rounded bottom configured to mate with the rounded end of a projection on the other mating collar part. Further, the assembly may include an elongated member having second collar parts at each opposing end of the member with each collar part aligned along an axis generally parallel to the longitudinal axis of the post. The assembly may also include a shelf having a first collar part at each corner of the shelf, or it may include a shelf having a first collar part at each corner of one end of the shelf, and second collar parts at each corner of an opposing end of the shelf. Moreover, the shelves may be locked to the post with an elongated member having a second collar parts at each end where each collar part is aligned along an axis generally parallel to the longitudinal axis and each second collar part is orientated to mate with a different one of the first collar parts on the shelf. Additionally, the shelf may have a top surface upon which items rest during use and each projection on the first collar part may extend away from the plane containing the top surface of the shelf, or each projection on the first collar part may extend toward the plane containing the top surface of the shelf. In still further variations, the assembly may include a two-part sleeve having a frusto-conical outer surface mating with the frusto-conical inner surface of the connector to wedge the sleeve against the post during use. The sleeve may have an outwardly extending lip on a bottom end of the sleeve.

There is also advantageously provided a connector assembly for use with posts having a longitudinal axis and a wedging sleeve between the connector assembly and the post to position shelves along the longitudinal axis of the post. The sleeve may have an inner surface conforming to the shape of the post and an outer surface with a wedge-shape that is closer to the longitudinal axis at the top than at the bottom of the sleeve. The connector includes a collar having first and second mating parts with each part having a base portion with two opposing arms extending outward in the same direction from opposing sides of the base portion. Each arm has a distal end with a distal edge forming a first side of a projection that extends generally parallel to the longitudinal axis. Each projection has a second opposing side that forms part of an adjoining recess shaped to receive an end of one of the projections of the other collar part. The recesses on each collar part are separated by a back portion. The base and back portions form opposing ends of the same part or surface. The peripheral length of the base between the first distal edges of the projection is greater than the peripheral length of the back between the recesses. The two opposing projections on the first collar extend in a first direction and the two opposing projections on the second collar extend opposite the first direction. The two recesses in each collar part receive a projection of the other collar part when the collar parts are mated together. The distal ends are separated by a gap of sufficient size to allow a length of the post to pass through the gap laterally. The collar forms an inclined inner surface that is closer to the longitudinal axis at a top end of the collar and further from the longitudinal axis at an opposing bottom end of the collar with the smaller end of the collar being smaller than the bottom end of the sleeve to wedge the sleeve against the post during use.

In further variations, each collar may have a cross-sectional shape comprising one of a C shape, a U-shape with a rounded bottom, or a U-shape with a flat bottom. The connector assembly preferably is configured for use with a post having a cylindrical cross-section and each arm has an inner surface that is curved as are the inner surfaces of the back and base portions to form a frusto-conical inner surface when the first and second collar parts are mated together. Further, each projection may have a rounded end and each recess may have a rounded bottom configured to mate with the rounded end of a projection on the other collar part.

The second collar parts may be placed on opposing ends of an elongated member having with each collar part aligned along an axis generally parallel to the longitudinal axis. The assembly may include a shelf having a first collar part at each corner of the shelf. Further, the assembly may include an elongated member having a second collar parts at opposing ends with each collar part aligned along an axis generally parallel to the longitudinal axis and each second collar part orientated to mate with a different one of the first collar parts on the shelf. Additionally, the shelf may have a top surface upon which items rest during use and each projection on the first collar part may extends away from the plane containing top surface of the shelf, or each projection on the first collar part may extend toward the plane containing the top surface of the shelf. The assembly may also include a shelf having a first collar part at each corner of a first end of the shelf and having second collar parts at an opposing, second end of the shelf.

Preferably, the connector assembly has a two-part sleeve having a frusto-conical outer surface mating with the frusto-conical inner surface of the connector to wedge the sleeve against the post during use. The sleeve preferably has an outwardly extending lip on a bottom end of the sleeve. In the above variations, the distal edges advantageously encircles more than 180 degrees of the post during use and the opposing side of each projection encircles less than 180 degrees of the post during use.

BRIEF DESCRIPTION OF THE DRAWINGS

FIG. 1 is an exploded, side plan view of a portion of a shelf and two mating connector parts of this invention;

FIG. 2 is an exploded, upper perspective view of the arrangement of FIG. 1 viewed toward the shelf;

FIG. 3 is an exploded, lower perspective view of the arrangement of FIG. 1 viewed toward the shelf;

FIG. 4 is an exploded, upper perspective view of the arrangement of FIG. 1 viewed toward a locking member;

FIG. 5 is an exploded, lower perspective view of the arrangement of FIG. 1 viewed toward the locking member;

FIG. 6 is an exploded, side plan view of the portion of a shelf and two mating connectors of FIG. 1, around a post but with no sleeve;

FIG. 7 is an exploded, upper perspective view of the arrangement of FIG. 6, viewed toward the shelf;

FIG. 8 is an exploded, lower perspective view of the FIG. 7 is an exploded, upper perspective view of the arrangement of FIG. 6, viewed toward the shelf;

FIG. 9 is an exploded, upper perspective view of the arrangement of FIG. 6, viewed toward the locking member;

FIG. 10 is an exploded, lower perspective view of the arrangement of FIG. 6, viewed toward the locking member;

FIG. 23 is an exploded perspective view of a shelf assembly using the connector of FIG. 1;

FIG. 24 is an exploded perspective view of a connector of FIG. 1, shelf, sleeve and post assembly;

FIG. 25 is an exploded perspective view of a shelf, connector, sleeve and post assembly with the projections oriented differently;

FIG. 26 is a perspective view of a connector joining two shelves to a post;

FIG. 27 is an exploded perspective view of a connector, sleeve and post having a rectangular cross-section; and FIG. 28 is an exploded perspective view of a connector, sleeve and post having a cross-section with circular ends joined by parallel sides.

DETAILED DESCRIPTION

Figure 22:
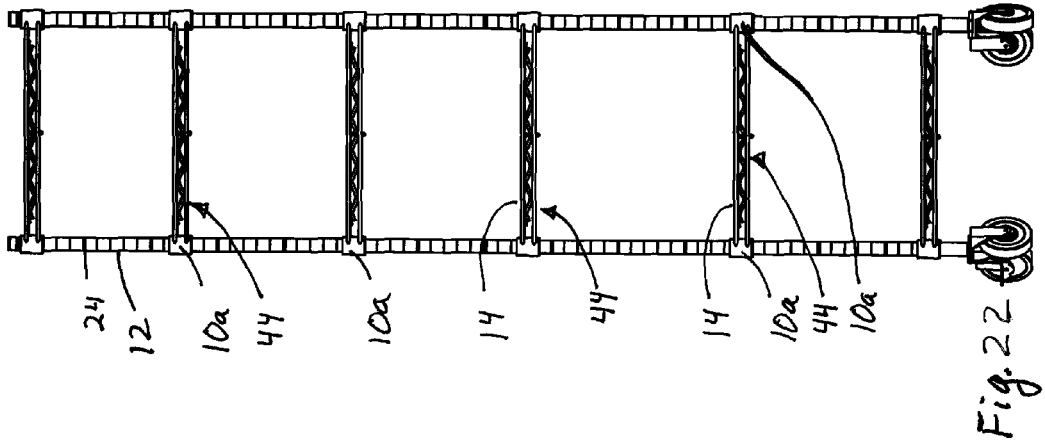
FIG. 22 is a side plan view of a shelving assembly of FIG. 21.
Figure 21:
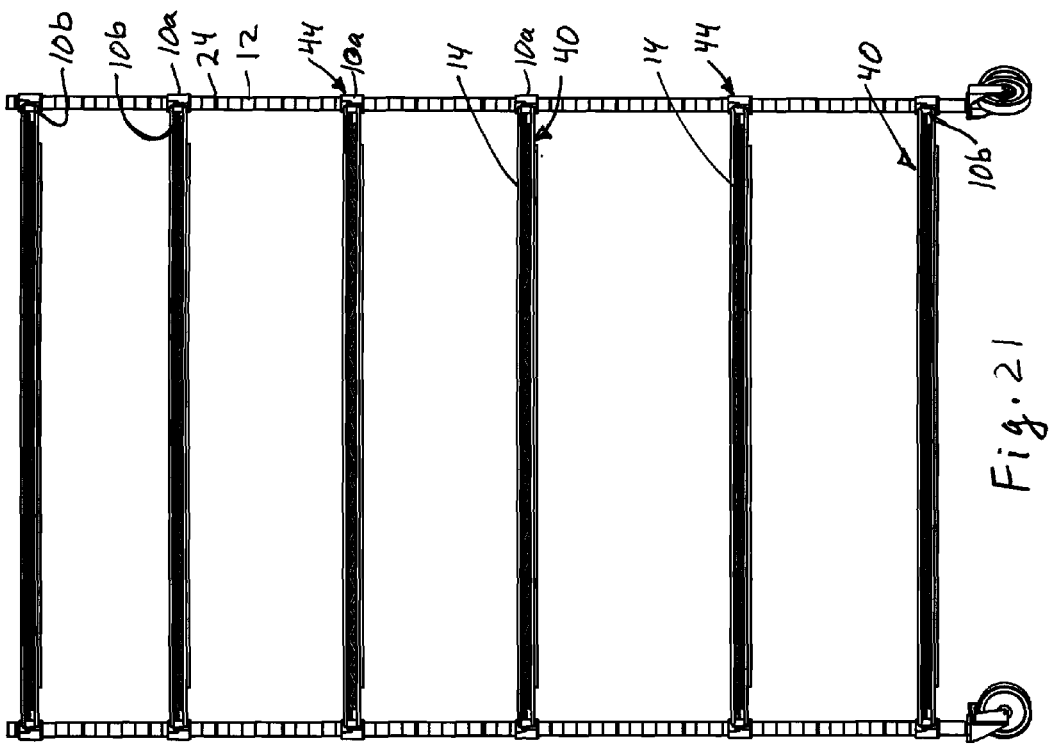
FIG. 21 is a side plan view of a shelving assembly having a plurality of shelves joined to posts using the connectors and sleeve of FIGS. 1-19.

Referring to FIGS. 1-20, but primarily to FIGS. 1-15, a collar or connector 10 of the present invention is described as used in a knock-down shelving system. The collar or connector 10 is preferably used in a shelving system that generally includes a plurality of support posts 12 which are preferably cylindrical, that is, that are generally circular in radial cross-section. In particular, four such posts 12 are arranged to support one or more shelves 14 at corner assemblies thereof. The shelves 14 are typically wire frame shelves having corners welded to the collars of the connectors 10 to form shelving assemblies 44, but other types of shelves 14 (FIGS. 21-22) can be used and other ways of engaging shelves to the connectors can be used. Of course, the connector 10 can be used in various other types of support systems, such as cabinets, closets, rolling carts, rolling racks and the like, with a shelving system being only one example. Moreover, the connector 10 can be used in conjunction with many shelf embodiments and is not limited to use with a corner of a shelf, or for that matter, a corner of any supported member. In the examples given below, the connector is structurally associated with a wire shelf frame designed to be fitted with split or slit sleeves 20 (FIGS. 16-20) having cylindrical inner surfaces sized to abut the post 12 with ribs 22 to mate grooves 24 in posts 12, the sleeves having a tapered, conical outer surface 26 typically taking the form of a frusto-conical surface. Such connectors, sleeves and associated shelving are descried in U.S. Pat. Nos. 3,523,508, 4,522,490 and 4,595,107, 352,358 and 4,222,490, the complete contents of which are incorporated herein by reference. Sleeves 20 preferably have an outwardly extending lip 28 at a lower end thereof, with the tapered outward facing surface 26 being smaller in diameter at the top and larger in diameter at the bottom to form a downwardly and outwardly inclined surface, preferably an annular surface. As used herein, inner and outer, upper and lower, above and below, top and bottom are with respect to longitudinal axis 30 of post 20 relative to the orientation of FIGS. 1-5, in which the direction of gravity is downward. As used herein, a reference to a surface generally parallel to the longitudinal axis includes the oppositely inclined surfaces of the sleeve and connectors 10a, 10b, which surfaces are inclined about 10 degrees or less and preferably inclined about 10 degrees or less.

The collar or connector 10 has first and second parts 10a, 10b. When the connectors 10a, 10b are fit together they form a tube having a slightly tapered inward facing surface that is larger in diameter at the bottom and narrower in diameter at the top, but having the diameter at the top being smaller than the diameter of the bottom of the outer surface 26 of sleeve 20 so that relative movement of sleeve 20 and connector 10 along axis 30 will deform the sleeve 20 toward the longitudinal axis 30 and post 12 to clamp the parts to the post and force the rib 22 into groove 24 of the post. The connectors 10a, 10b preferably have a frusto-conical inner surface when mating a frusto-conical outer surface of sleeve 20.

The collar or connector parts 10a, 10b each have two projections 32 extending along a length of and generally parallel to the axis 30, but the projections are slightly inclined as the mated connector parts 10a, 10b have an inner surface that is tapered to force the sleeve 20 inward and depending on the orientation of a specific projection 32 on the collar 10 the orientation of at least the inside surface will vary. The inner surface of the projections 32, and preferably the projections 32, are generally parallel to the abutting surface of outer surface 26 of sleeve 20 during use. The projections 32 are curved as they form a wall of the tube with a frusto-conical inner surface abutting sleeve 20 during use, so at least the inner surface of the projections 32 are preferably curved. The smallest diameter or opening of the collar parts 10 is smaller than the largest diameter or dimension of the sleeve 20. Each of the connector parts 10a, 10b each extend more than 180 degrees around the longitudinal axis 20, but less than 370 degrees and preferably less than 270 degrees. The connector parts 10 each have two distal ends that are spaced apart to form a C-shape in cross section with a gap between those distal ends. The distal ends preferably comprise projections 32 that extend in the same direction on one collar part 10a, and extend in the opposing direction in the other collar part 10b. The projections 32 on two mating collars 10a, 10b thus extend in opposing directions generally parallel to longitudinal axis 30 and mate with recesses 34 in the other connector part that are located circumferentially inward of the projections 32. Thus, as shown in FIGS. 1-15, first connector part 10a has two upwardly extending projections 32a at each of its distal ends, with an upwardly facing recess 34a adjacent each projection 32a. The projections 32 inclined to align with the shape of the outer surface 26 of sleeve 20. The projections 32 preferably have straight distal edges 36 with round ends and the recesses 34 are preferably rounded to conform to the shape of and mate with the rounded ends of projections 32. Thus, the second connector part 10b has downwardly extending projections 32b at its distal ends and a downwardly facing recess 34b adjacent each depending projection 32b. The recesses 34 preferably have a circumferentially inward edge 38 that is straight and generally parallel with the longitudinal axis 20. When assembled, the upwardly extending projections 32a fit into downward facing recesses 34b, and the downwardly depending projections 32b fit into the upwardly facing recesses 34a. The straight edges 36 and 38 abut each other so that each of the straight edges 36a on the distal edge of one of the upward projections 32a abuts a different one of the straight edges 38b on the mating recess 34b which recess receives one of the two projections 32a.

Viewed from the sides, orthogonal to the longitudinal axis 30, the curved juncture of the connector parts 10a, 10b resembles an S or a mirror image thereof, depending on which side is being viewed. The projections 32 and adjacent recesses 34 form a crenelated shape with rounded corners. The projections 32 and recesses 34 interlock to form a connection that resists radially outward forces that would otherwise separate the connector parts 10a, 10b.

Rounded ends 32 and recesses 34 are preferred as the curves reduce stress concentrations. But other shapes could be used, including beveled corners on square projections 32 and recesses 34, or even sharp corners, or triangular projections 32 and mating portions of recesses 34. The projections 32 have distal edges 36 that are less than 180 degrees apart measured along longitudinal axis 30 and thus form a gap between those distal edges. Recesses 34 preferably have both sides of the recess less than 180 degrees apart measured along longitudinal axis 30, with one side of the recess 34 being formed by an inward side of the projection 32 so each recess 34 adjoins a projection 32. Thus, preferably the projections 32 have a distal edge more than 180 degrees apart and have an inner edge closer than 180 degrees apart. The rounded ends of the projections 32 also make it easier to mate the projections with the recesses 34 so the parts can be mated by moving one or both of them along axis 30.

The recesses 34 are preferably separated by a back portion 37 that extends between edges 38 of the two recesses 34 on each collar part. Thus, back portion 37a extends between straight edges 38a, 38a of connector part 10a, and back portion 38b extends between straight edges 38b, 38b of connector part 10b. In the illustrated embodiment back 37 has a cylindrical curve that joins the edges 38.

The distal edges 36 of the projection are separated by a base portion 39 that also joins the distal edge the projections together. Thus, base portion 39a extends between straight edges 36a, 36a of connector part 10a, and base portion 39b extends between straight edges 36b, 36b of connector part 10b. In the illustrated embodiment base 39 has a cylindrical curve that joins the edges 36. The back 37 is on the opposite end of the collar or connector 10 as the base 39. Moreover, the base 39 extends around an arc of greater than 180 degrees, while the back 37 extends around an arc of less than 180 degrees. Each end of the assembled connector 10 has an upper edge made up of a back 37 and a back 39, as does the lower edge. Each of the back 37 and base 39 are opposing ends of a curved wall forming the generally cylindrical connector 10 having the frusto-conical inward facing surface that wedges against sleeve 20 to clamp the connector 10 and sleeve 20 to the post 12. In the connector 10 of FIGS. 1, 6 and 11, the upper end of the connector having back 37b and base 39a forms a smaller internal circumference than the lower inner circumference formed by back 37a and base 39b. Because the wedging action of connector 10 uses a slightly tapered inner surface on the connectors, the upper circumference and upper diameter of the connector are smaller than the corresponding circumference and diameter at the bottom of the connector 10.

Figure 12:
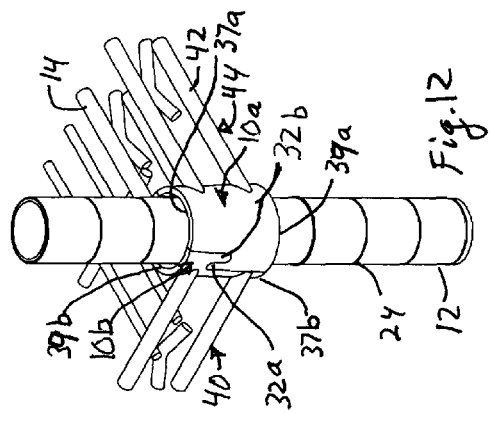
FIG. 12 is an exploded, upper perspective view of the arrangement of FIG. 11, viewed toward the shelf.
Figure 11:
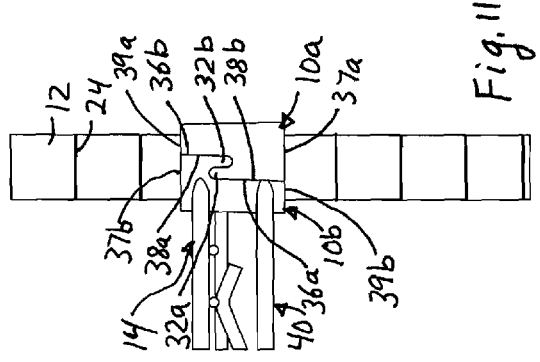
FIG. 11 is a side plan view of a the arrangement of FIG. 6 with the locking member connected to the shelf and encircling the post.
Figure 13:
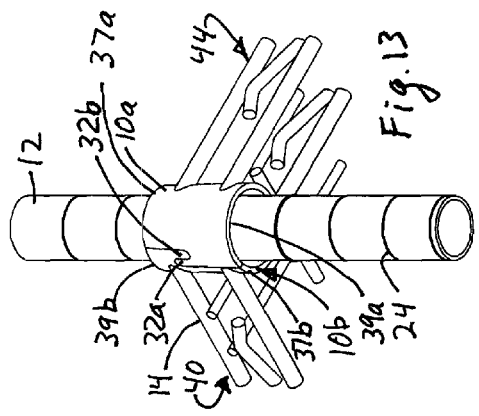
FIG. 13 is an exploded, lower perspective view of the arrangement of FIG. 11, viewed toward the shelf.
Figure 14:
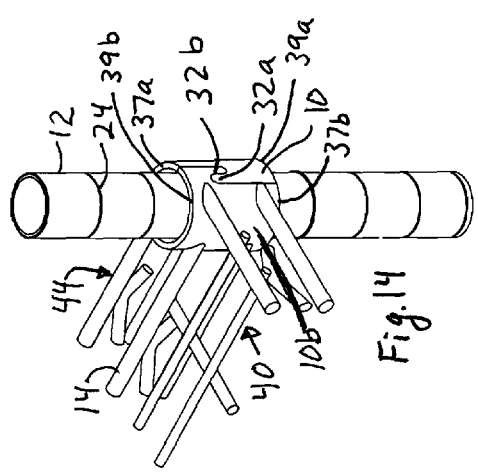
FIG. 14 is an exploded, upper perspective view of the arrangement of FIG. 11, viewed toward the locking member.
Figure 15:
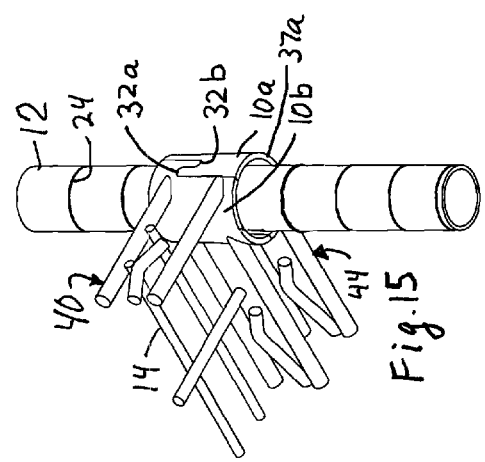
FIG. 15 is an exploded, lower perspective view of the arrangement of FIG. 11, viewed toward the locking member.
Figure 19:
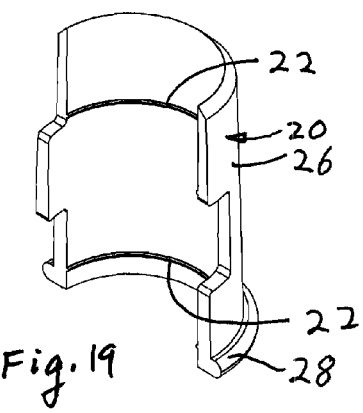
FIG. 19 is an upper perspective view of the half sleeve of FIG. 16.
Figure 18:
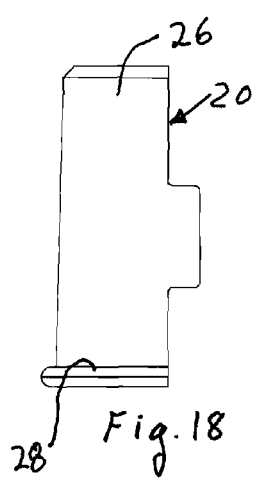
FIG. 18 is a left side plan view of the half sleeve of FIG. 16.
Figure 16:
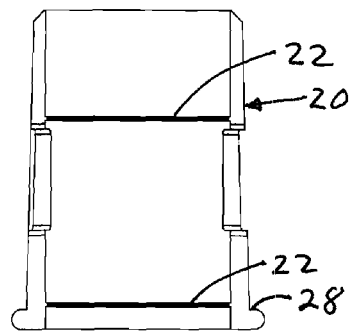
FIG. 16 is a front plan view of one half of a sleeve suitable for use with the shelving connectors of FIGS. 1-15, with the other half of the sleeve being a mirror image thereon.
Figure 17:
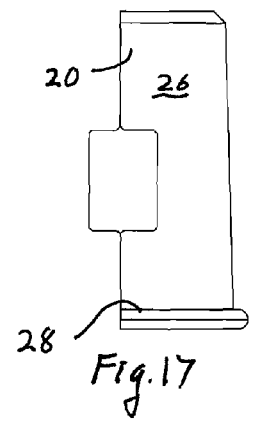
FIG. 17 is a right side plan view of the half sleeve of FIG. 16.
Figure 20:
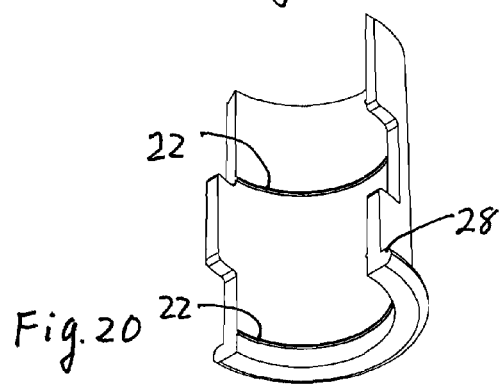
FIG. 20 is a bottom perspective view of the half sleeve of FIG. 16.

The connector parts 10a, 10b may have the projections 32 and recesses 34 facing the opposite directions as described above. Referring to FIG. 11, the connector 10 has a shelf 14 with a top surface upon which items rest during use and each projection 32b on the second collar 10b connected to the shelf is directed downward, away from the top of the shelf. Each projection 32a on first connector 10a is directed upward, toward the top of the shelf. In contrast, as seen in FIGS. 25 and 27-28, the second connector 10b connected to the shelf 14 may have each projection 32b extending axially upward, toward the top of the shelf and each projection 32a on first connector 10a directed axially downward, away from the top of the shelf.

In more detail, first connector part 10a has two upwardly extending projections 32a at each of its distal ends, with an upwardly facing recess 34a adjacent each projection 32a. The projections 32 are inclined to align with the shape of the outer surface 26 of sleeve 20. The projections 32 preferably have straight distal edges 36 with round ends and the recesses 34 are preferably rounded to conform to the shape of and mate with the rounded ends of projections 32. The second connector part 10b has downwardly extending projections 32b at its distal ends and a downwardly facing recess 34b adjacent each depending projection 32b. The recesses 34 preferably have a circumferentially inward edge 38 that is straight and generally parallel with the longitudinal axis 20. When assembled, the upwardly extending projections 32a fit into downward facing recesses 34b, and the downwardly depending projections 32b fit into the upwardly facing recesses 34a. The straight edges 36 and 38 abut each other so that each of the straight edges 36a on the distal edge of one of the upward projections 32a abuts a different one of the straight edges 38b on the mating recess 34b which recess receives one of the two projections 32a.

Referring to FIG. 23, a shelf assembly 40 is formed having each of four corners of a shelf 14 connected to a different connector part 10. The shelf 14 is shown as having connector parts 10b at each corner of the shelf, which connector part has projections 32b facing downward. The shelf assembly 40 could also have connector parts of the shape shown in FIG. 1 as part 10a at each corner, with projections 32a facing upward (FIGS. 25, 26-27). That orientation has some advantages discussed later. But in either orientation, the projections 32 are preferably generally aligned with the longitudinal axes of posts 12 and generally perpendicular to the plane of the shelf 14. The corner posts 12 have a sleeve 20 (FIGS. 16-20 and 24-28) positioned at the desired location of a shelf, preferably with one or more internal ribs 22 engaging a mating groove or grooves 24 in the post 10. The ribs could be on the post and the grooves on the sleeve.

The space between distal ends 36b of the connector 10b are wide enough so the post 10 can fit between the distal ends 36b, even if the ends 36b are resiliently deformed (without elastic deformation) to place the posts inside the connectors or vice versa. The connector parts 10b are each placed on a different but corresponding corner post 10 above the sleeve 20 on that post and the connector part 10b is moved along axis 30 of post 10 so the inward surface on the connector part 10b mates with the outward facing inclined surface 26 on the sleeve 20 to wedge against the sleeve and post and thereby to temporarily fasten the engaged connector part 10b, sleeve 20 and post together. This wedging occurs because the connector 10a is tapered and its smallest opening or diameter is smaller than the largest diameter or dimension of the sleeve 20 that must pass through the mating part of connector 10b. When each of the four connector parts 10b is fastened to its corresponding corner post 10, the shelf 12 is self-supporting.

Because the distal ends 36b of connectors 10b are not connected to each other and have a gap between them, the shelf 12 can be pulled out of engagement with the corner posts when enough weight or force is applied to spread the distal ends apart enough to pull the post through the gap between the distal ends of at least one connector 10b. A locking member 44 prevents that. Two locking assemblies 44 are provided, with each locking assembly having an elongated member 42 with a connector part, shown here as first connector part 10a fastened to opposing ends of each member 42 and aligned to mate with the opposing connector part, shown here as second connector parts 10b during use. The space between distal ends 36a of the connector 10a on opposing ends of the locking member 42 are wide enough so the post 10 can fit between the distal ends 36a on the locking member 42, even if the ends 36a are resiliently deformed (without elastic deformation) to place the posts inside the connectors 10a or vice versa. The connector parts 10a on the locking connector 42 are placed onto two adjacent corner posts at a location below the mating connector parts 10b and the connector parts are then engaged with the projections 32 of one part fitting into the recesses 34 of the other part. This is preferably done before moving the connected parts 10a, 10b onto the sleeves when the shelf assembly has projections 32 facing downwardly. Alternatively, the locking assembly 44 may be placed on two adjacent sleeves 20 to engage two adjacent corner posts 12, with the projections 32a and recesses 34a facing upward. After the locking assembly 44 is installed, then the shelf assembly and its connector 10b with downwardly facing projections 32b and recesses 34b may be have posts enter the connector parts 10b and the connector parts and shelf moved downward to mate with the recesses 34a and projections 34a in the locking connector. The rounded ends of the projections 32 help align the parts, and the straight edges 38a, 38b also help align the parts along axis 10, making engagement fast and easy. A locking member 42 on opposing ends of a shelf assembly locks the shelf to the posts. Alternatively, the mating connectors may be on an adjacent shelving unit rather than on a locking assembly 44.

A simplified shelving unit would include four corner posts, at least one and preferably more shelf assemblies 40 with first connectors 10a on each corner of the shelf assembly, and two locking members 42 for each shelf assembly 40, and four sleeves 20 for each shelf. A shelving kit preferably includes those parts and more preferably includes two, three, four, five or six shelf assemblies 40 and twice the number of locking members 42 as there are shelves and four times the number of sleeves 20 as there are shelves. More shelf assemblies 40 may be provided.

Further, the shelving assembly 40 may be provided with connectors 10a, or 10b on the corners of the shelf 14. As shown in FIG. 26, the shelving assembly 40 may have connectors of the configuration shown in part 10a on one end of the shelf and connectors of the configuration shown in part 10b on the other end of the shelf. Fig. a second connector part 10b at each corner, so that the locking member 42 is effectively provided at each end of a shelf assembly 40b. The second shelf connector 10b could be used to connect two corner posts 10 of a first shelving unit to a second shelving unit. It is also believed suitable to have two lower connectors 10a on one end of a shelf assembly 40 and to have two second connectors 10b on the opposing end. A kit may include the above combination of parts and combinations thereof.

The shelves 12 and connector parts 10 are preferably made of metal, but could be made of plastic or other non-metal materials, recognizing that the weight that can be supported on the shelves will probably be less than with metal. It is believed possible to have more than two projections 32 and two recesses 34 on each connector part 10, but a stronger connection is believed achievable with two projections and two recesses.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description uses a cylindrical post 12 with a circular cross-sectional shape. Other shapes can be used for the posts 12, with the connector parts 10a, 10b and sleeve 20 having conforming shapes so they wedge together when weight is placed on the shelves 14. For example, FIG. 27 shows a rectangular shaped post 12 with a rectangular shaped sleeve 20 having a wedge shaped outer surface having a top dimensions smaller than the dimensions of the corresponding sides at the bottom of the sleeve to form a wedge shaped surface. As used herein, a rectangular shape includes a square. The mating connector 10 has rectangular shaped connector parts 10a, 10b with projections 32 engaging recesses 34 along one of the flat sides of the sleeve 20, and with a correspondingly shaped sleeve 20 and post 12.

FIG. 28 shows a post 12 with rounded, cylindrical ends and flat sides, with a sleeve 20 having a conforming shape but a bottom larger than the top to form a wedge shape on at least one outer surface, preferably on two opposing surfaces and more preferably on all surfaces. The projections 32 on the connector parts 10a, 10b mate with the aligned recesses 34 on the flats of the sleeve 20 and post 12. But the connection of projections 32 could be located on the curved sides. Thus, the interlocking projections 32 and recesses 34 are not limited to a cylindrical shape.

The above description is given by way of example, and not limitation. Given the above disclosure, one skilled in the art could devise variations that are within the scope and spirit of the invention, including various ways of releasably fastening the side panels 14, 16, 18 and 20 to the center panel 12, and of releasably fastening the bottoms c to the container bottom 30. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A connector assembly for use with posts having a cylindrical cross-section of diameter D with a wedging sleeve to position shelves along a longitudinal axis of the post, the sleeve having a frusto-conical outer surface with a first, small sleeve end and a second, larger sleeve end with both ends encircling the longitudinal axis during use, the connector comprising:
a collar having first and second mating parts which when mated form a frusto-conical surface sized to encircle and wedge against the sleeve during use, each collar part having two distal ends with projections extending in opposing directions along the axis and having an inner surface extending along the frusto-conical surface of the collar, the two distal ends of each mating part being separated by a gap sufficiently large to allow the post to pass laterally through the gap during use, each projection forming a side of a recess adjoining each projection with the recess located circumferentially inward of the adjoining projection so the adjoining projection extends along the axis a distance beyond the adjoining recess, the recess configured to receive a projection on the other collar part, the projections on the first mating collar part extending in a first direction along the axis during use and the projections on the second mating collar part extending in an opposing direction along the axis during use.

2. The connector assembly of claim 1, wherein each projection has a rounded end and each recess has a rounded bottom configured to mate with the rounded end of a projection on the other mating collar part.

3. The connector assembly of claim 1, further including an elongated member having second collar parts at each end with each collar part aligned along an axis generally parallel to the longitudinal axis.

4. The connector assembly of claim 1, further including a shelf having a first collar part at each corner of the shelf.

5. The connector assembly of claim 4, further including an elongated member having a second collar parts at each end with each collar part aligned along an axis generally parallel to the longitudinal axis and each second collar part orientated to mate with a different one of the first collar parts on the shelf.

6. The connector assembly of claim 4, wherein the shelf has a top surface upon which items rest during use and each projection on the first collar part extends away from the plane containing top surface of the shelf.

7. The connector assembly of claim 4, wherein the shelf has a top surface upon which items rest during use and each projection on the first collar part extends toward the plane containing the top surface of the shelf.

8. The connector assembly of claim 1, further including a shelf having a first collar part at each corner of a first end of the shelf and having second collar parts at an opposing, second end of the shelf.

9. The connector assembly of claim 1, further comprising a two-part sleeve having a frusto-conical outer surface mating with the frusto-conical inner surface of the connector to wedge the sleeve against the post during use, the sleeve having an outwardly extending lip on a bottom end of the sleeve.

10. A connector assembly for use with posts having a longitudinal axis and a wedging sleeve between the connector assembly and the post to position shelves along the longitudinal axis of the post, the sleeve having an inner surface conforming to the shape of the post and an outer surface with a wedge-shape that is closer to the longitudinal axis at the top than at the bottom of the sleeve, the connector comprising:
a collar having first and second mating parts with each part having a base portion with two opposing arms extending outward in the same direction from opposing sides of the base portion, each arm having a distal end with a distal edge forming a first side of a projection that extends generally parallel to the longitudinal axis, the projection having a second opposing side that forms part of an adjoining recess shaped to receive an end of one of the projections of the other collar part, the recesses being separated on each collar part by a back portion, the base portion and back portion forming opposing ends of the same part with the peripheral length of the base between the first distal edges of the projection being greater than the peripheral length of the back between the recesses, the two opposing projections on the first collar extending in a first direction and the two opposing projections on the second collar extending opposite the first direction, the two recesses in each collar part receiving a projection of the other collar part when the collar parts are mated together, the distal ends being separated by a gap of sufficient size to allow a length of the post to pass through the gap laterally, the collar forming an inclined inner surface that is closer to the longitudinal axis at a top end of the collar and further from the longitudinal axis at an opposing bottom end of the collar with the smaller end of the collar being smaller than the bottom end of the sleeve to wedge the sleeve against the post during use.

11. The connector assembly of claim 10, wherein the collar is configured to engage a post having a cylindrical cross-section and each arm has an inner surface that is curved as are the inner surfaces of the back and base portions to form a frusto-conical inner surface when the first and second collar parts are mated together.

12. The connector assembly of claim 11, wherein each projection has a rounded end and each recess has a rounded bottom configured to mate with the rounded end of a projection on the other collar part.

13. The connector assembly of claim 11, further including an elongated member having second collar parts at opposing ends of the elongated member with each collar part aligned along an axis generally parallel to the longitudinal axis.

14. The connector assembly of claim 11, including a shelf having a first collar part at each corner of the shelf.

15. The connector assembly of claim 14, further including an elongated member having a second collar parts at opposing ends with each collar part aligned along an axis generally parallel to the longitudinal axis and each second collar part orientated to mate with a different one of the first collar parts on the shelf.

16. The connector assembly of claim 14, wherein the shelf has a top surface upon which items rest during use and each projection on the first collar part extends away from the plane containing top surface of the shelf.

17. The connector assembly of claim 14, wherein the shelf has a top surface upon which items rest during use and each projection on the first collar part extends toward the plane containing the top surface of the shelf.

18. The connector assembly of claim 11, including a shelf having a first collar part at each corner of a first end of the shelf and having second collar parts at an opposing, second end of the shelf.

19. The connector assembly of claim 11, further comprising a two-part sleeve having a frusto-conical outer surface mating with the frusto-conical inner surface of the connector to wedge the sleeve against the post during use, the sleeve having an outwardly extending lip on a bottom end of the sleeve.

20. The connector assembly of claim 11, wherein the distal edges encircle more than 180 degrees of the post during use and the opposing side of each projection encircles less than 180 degrees of the post during use.

21. The connector assembly of claim 11, wherein each collar has cross-sectional shape with an interior surface facing the sleeve that has one of a C shape, a U-shape with a rounded bottom, or a U-shape with a flat bottom.

22. A connector assembly for use with posts having a cylindrical cross-section of diameter D with a wedging sleeve to position shelves along a longitudinal axis of the post, the sleeve having a frusto-conical outer surface with a first, small sleeve end and a second, larger sleeve end with both ends encircling the longitudinal axis during use, the connector comprising:
  a collar having first and second mating parts which when mated form a frusto-conical surface sized to encircle and wedge against the sleeve during use, each collar part having two distal ends with projections having an inner surface extending along the frusto-conical surface of the collar, the distal ends being separated by a gap sufficiently large to allow the post to pass laterally through the gap during use, each projection forming a side of a recess adjoining each projection, the recess configured to receive a projection on the other collar part,
  a shelf having a first collar part at each corner of the shelf, the shelf having a top surface upon which items rest during use and each projection on the first collar part extending away from the plane containing top surface of the shelf.

23. A connector assembly for use with posts having a cylindrical cross-section of diameter D with a wedging sleeve to position shelves along a longitudinal axis of the post, the sleeve having a frusto-conical outer surface with a first, small sleeve end and a second, larger sleeve end with both ends encircling the longitudinal axis during use, the connector comprising:
  a collar having first and second mating parts which when mated form a frusto-conical surface sized to encircle and wedge against the sleeve during use, each collar part having two distal ends with projections having an inner surface extending along the frusto-conical surface of the collar, the distal ends being separated by a gap sufficiently large to allow the post to pass laterally through the gap during use, each projection forming a side of a recess adjoining each projection, the recess configured to receive a projection on the other collar part,
  a shelf having a first collar part at each corner of the shelf, the projections on the first mating collar part extending in a first direction along the axis during use and the projections on the second mating collar part extend in an opposing direction along the axis during use.

* * * * *